US009823854B2

(12) United States Patent
Valenzuela et al.

(10) Patent No.: US 9,823,854 B2
(45) Date of Patent: Nov. 21, 2017

(54) PRIORITY-BASED ACCESS OF COMPRESSED MEMORY LINES IN MEMORY IN A PROCESSOR-BASED SYSTEM

(71) Applicant: QUALCOMM Incorporated, San Diego, CA (US)

(72) Inventors: Andres Alejandro Oportus Valenzuela, Los Gatos, CA (US); Amin Ansari, San Diego, CA (US); Richard Senior, San Diego, CA (US); Nieyan Geng, San Diego, CA (US); Anand Janakiraman, San Diego, CA (US); Gurvinder Singh Chhabra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/074,444

(22) Filed: Mar. 18, 2016

(65) Prior Publication Data
US 2017/0269851 A1    Sep. 21, 2017

(51) Int. Cl.
*G06F 3/06*      (2006.01)
*G06F 12/0897*   (2016.01)

(52) U.S. Cl.
CPC .......... *G06F 3/0611* (2013.01); *G06F 3/0626* (2013.01); *G06F 3/0659* (2013.01);
(Continued)

(58) Field of Classification Search
CPC .... G06F 3/0611; G06F 3/0626; G06F 3/0659; G06F 3/0661; G06F 3/0665; G06F 3/0673; G06F 12/0897
(Continued)

(56) References Cited

U.S. PATENT DOCUMENTS

| | | | | |
|---|---|---|---|---|
| 5,752,266 A | * | 5/1998 | Miyawaki | G06F 13/18 711/151 |
| 6,697,076 B1 | * | 2/2004 | Trivedi | G06F 12/0815 345/531 |

(Continued)

OTHER PUBLICATIONS

Pekhimenko, Gennady et al., "Linearly Compressed Pages: A Low-Complexity, Low-Latency Main Memory ompression Framework," MICRO-46 Proceedings of the 46th Annual IEEE/ACM International Symposium on Microarchitecture, Dec. 7-11, 2013, Davis, CA, ACM, 13 pages.

(Continued)

*Primary Examiner* — Stephen Elmore
(74) *Attorney, Agent, or Firm* — W&T/Qualcomm

(57) ABSTRACT

Aspects disclosed relate to a priority-based access of compressed memory lines in a processor-based system. In an aspect, a memory access device in the processor-based system receives a read access request for memory. If the read access request is higher priority, the memory access device uses the logical memory address of the read access request as the physical memory address to access the compressed memory line. However, if the read access request is lower priority, the memory access device translates the logical memory address of the read access request into one or more physical memory addresses in memory space left by the compression of higher priority lines. In this manner, the efficiency of higher priority compressed memory accesses is improved by removing a level of indirection otherwise required to find and access compressed memory lines.

30 Claims, 13 Drawing Sheets

(52) U.S. Cl.
CPC .......... *G06F 3/0661* (2013.01); *G06F 3/0665* (2013.01); *G06F 3/0673* (2013.01); *G06F 12/0897* (2013.01); *G06F 2212/1024* (2013.01); *G06F 2212/1044* (2013.01); *G06F 2212/1056* (2013.01); *G06F 2212/152* (2013.01); *G06F 2212/401* (2013.01)

(58) Field of Classification Search
USPC ........ 711/122, 151, 154, 156, 158, 202, 217
See application file for complete search history.

(56) References Cited

U.S. PATENT DOCUMENTS

| | | | |
|---|---|---|---|
| 7,636,810 B2 | 12/2009 | Ramakrishnan | |
| 7,680,992 B1 | 3/2010 | Van Dyke et al. | |
| 7,877,539 B2* | 1/2011 | Sinclair | G06F 12/0246 711/103 |
| 7,984,233 B2* | 7/2011 | Sinclair | G06F 3/0607 711/103 |
| 8,122,216 B2 | 2/2012 | Daly et al. | |
| 8,214,583 B2* | 7/2012 | Sinclair | G06F 3/0608 711/103 |
| 8,356,137 B2* | 1/2013 | Post | G06F 3/0644 711/103 |
| 8,527,467 B2 | 9/2013 | Shmueli | |
| 2001/0054131 A1 | 12/2001 | Alvarez et al. | |
| 2004/0068627 A1* | 4/2004 | Sechrest | G06F 12/122 711/158 |
| 2005/0080986 A1* | 4/2005 | Park | G06F 12/0246 711/103 |
| 2013/0132653 A1* | 5/2013 | Post | G06F 3/0644 711/103 |
| 2014/0258247 A1 | 9/2014 | Chu et al. | |
| 2014/0325166 A1* | 10/2014 | Iyigun | G06F 3/0685 711/158 |

OTHER PUBLICATIONS

International Search Report and Written Opinion for PCT/US2017/018876, dated May 17, 2017, 12 pages.

* cited by examiner

PRIORITY-BASED ACCESS OF COMPRESSED MEMORY LINES IN MEMORY IN A PROCESSOR-BASED SYSTEM

BACKGROUND

I. Field of the Disclosure

The technology of the disclosure relates generally storing data in computer memory, and more particularly to accessing compressed and uncompressed memory lines in memory of a processor-based system.

II. Background

Computing devices are prevalent in society. These devices may include servers, computers, cellular telephones, portable digital assistants ("PDAs"), portable game consoles, palmtop computers, and other electronic devices. Computing devices conventionally include a processor-based system that performs computational tasks in a wide variety of applications. The processor-based system may be included with other integrated circuits designed to work together in a system-on-a-chip ("SoC"), to deliver functionality to a user. A typical processor-based system includes one or more processors that execute software instructions. The software instructions instruct a processor to fetch data from a location in a memory, perform one or more processor operations using the fetched data, and generate a stored result. As examples, software instructions can be stored in a system or main memory. The software instructions can also be fetched and stored in a cache memory for faster fetching. For example, the cache memory ("cache") can be a cache memory local to the processor, a shared local cache among processors in a processor block, a shared cache among multiple processor blocks, or a main memory of the processor-based system. In this regard, the size of the memory lines accessed from system or main memory may be the size of the cache lines to allow accessed memory lines in system or main memory for a memory access to fill up a cache line in cache memory for efficiency purposes.

FIG. 1 is a schematic diagram of an exemplary SoC 100 that includes a processor-based system 102. The processor-based system 102 includes a plurality of processor blocks 104(1)-104(N), wherein 'N' is equal to any number of processor blocks 104 desired. Each processor block 104(1)-104(N) contains two processors 106(1), 106(2) and a shared level 2 (L2) cache 108(1)-108(N), respectively. A shared level 3 (L3) cache 110 is also provided for storing cached data that is used by any of, or shared among, each of the processor blocks 104(1)-104(N). An internal system bus 112 is provided that allows each of the processor blocks 104(1)-104(N) to access the shared L3 cache 110 as well as other shared resources including a memory controller 114 for accessing a main, external memory (e.g., double-rate dynamic random access memory (DRAM) (DDR)), peripherals 116, other storage 118, an express peripheral component interconnect (PCI) interface 120, a direct memory access (DMA) controller 122, and an integrated memory controller (IMC) 124.

As processor-based systems increase in complexity and performance, the memory capacity requirements of memory may also increase. However, providing additional memory capacity in a processor-based system increases cost and area needed for memory on an integrated circuit. Memory capacity compression, such as cache line level compression, where each memory line the size of cache lines is independently compressed, may be employed transparent to the operating system to increase the effective memory capacity of the processor-based system without increasing physical memory capacity. However, addressing compressed lines in memory can increase memory read access latency, because processing time is incurred uncompressing the compressed data in response to a memory read access. Further, writing compressed data to memory can increase memory write latency, because processing time is incurred in compressing the data to be written into memory. Still further, data compression can increase memory management complexity, because the processor maps logical memory addresses of fixed-size cache lines, to corresponding physical memory addresses that store variable size compressed cache lines in memory corresponding to the fixed size cache lines. As a result, for example, accessing a particular cache line in memory may require access to metadata in the memory and an additional layer of address computation to determine the location of the compressed cache line in memory corresponding to the particular cache line. This can increase complexity, cost, and latency to a processor-based system employing memory capacity compression.

SUMMARY OF THE DISCLOSURE

Aspects disclosed herein include priority-based access of compressed memory lines in memory in a processor-based system. In this regard, in one exemplary aspect, a memory access device (e.g., a memory controller or compression/decompression engine) in a processor-based system receives a read access request, which includes a logical memory address, to access a memory line from memory. Each addressable memory location in memory is configured to store data of a memory line up to the size of a burst data length, which may be a cache line size. The memory access device determines a priority of the read access request. If the read access request is a higher priority read access request, the memory access device uses a logical memory address of the read access request as the physical memory address to access a memory location that stores a compressed memory line in memory. The compressed memory line in memory includes the requested higher priority data in compressed form (i.e., a compressed higher priority memory line). In this manner, latency associated with translation of the logical memory address of the higher priority read access request to the corresponding physical memory address is not required to determine and access the memory location of the corresponding compressed memory line in memory. As a result, memory read access latency for higher priority data can be reduced.

Storing compressed higher priority memory lines in memory at the logical memory address used to access the corresponding higher priority data allows faster access to the higher priority data. It also creates additional space in memory for storing compressed lower priority memory lines. For example, compressed lower priority memory lines can be stored in "holes," which are left over spaces between stored compressed higher priority memory lines in memory. In this regard, if the read access request is a lower priority read access request, the memory access device translates the logical memory address of the read access request into a physical memory address based on the logical memory address. The memory access device then uses the physical memory address to access a memory location that stores a compressed memory line in memory that includes the requested lower priority data in compressed form, i.e., a compressed lower priority memory line. In this manner, translation of the logical memory address for memory read accesses is limited to lower priority read access requests, thus providing a higher overall memory access efficiency of compressed memory lines in the processor-based system.

In this regard, in one exemplary aspect, a memory access device for accessing a memory line stored in a memory in a processor-based system is provided. The memory access device comprises a control port configured to receive a read access request including a logical memory address and a memory access port configured to access the memory. The memory access device is configured to determine a priority of the read access request among a higher priority read access request and a lower priority read access request. The memory access device is further configured to, in response to determining that the read access request is a higher priority read access request, retrieve through the memory access port a compressed higher priority memory line from the memory at the logical memory address of the read access request. The memory access device is further configured to, in response to determining that the read access request is a lower priority read access request, retrieve through the memory access port a compressed lower priority memory line from the memory at physical memory addresses determined based on the logical memory address of the read access request.

In another exemplary aspect, a memory access device for accessing a memory line stored in a memory in a processor-based system is provided. The memory access device for accessing the memory line includes a means for receiving a read access request comprising a logical memory address and a means for accessing a memory. The memory access device for accessing the memory line comprises a means for determining a priority of the read access request among a higher priority read access request and a lower priority read access request. The memory access device for accessing the memory line further comprises a means for retrieving through the means for accessing the memory, a compressed higher priority memory line from the memory at the logical memory address of the read access request in response to the means for determining that the priority of the read access request is a higher priority read access request. The memory access device for accessing the memory line also comprises a means for retrieving through the means for accessing the memory, a compressed lower priority memory line from the memory at a plurality of physical memory addresses determined based on the logical memory address of the read access request in response to the means for determining that the read access request is a lower priority read access request.

In another exemplary aspect, a method for accessing a memory line stored in a memory in a processor-based system is provided. The method for accessing the memory line, includes receiving, by a memory access device, a read access request and determining a priority of the read access request among a higher priority read access request and a lower priority read access request. The method for accessing the memory location further includes, in response to determining that the read access request is a higher priority read access request, retrieving through a memory access port of the memory access device a higher priority data stored at a memory location in the memory at the logical memory address of the read access request. The method for accessing the memory line further includes, in response to determining that the read access request is a lower priority read access request, retrieving through the memory access port of the memory access device a lower priority data stored at a plurality of contiguous memory locations in the memory at physical memory addresses determined based on the logical memory address of the read access request.

In another aspect, a processor-based system for accessing a memory line in a memory is provided. The process-based system comprises a memory, a processor coupled to the memory and configured to access the memory, and a memory access device coupled to the memory and the processor. The memory access device is configured to receive a read access request comprising a logical memory address from the processor, and determine a priority of the read access request among a higher priority read access request and a lower priority read access request. The memory access device is further configured to, in response to determining that the read access request is a higher priority read access request, retrieve a compressed higher priority memory line from the memory at the logical memory address of the read access request. The memory access device is also configured to, in response to determining that the read access request is a lower priority read access request, retrieve a compressed lower priority memory line from the memory at a plurality of physical memory addresses determined based on the logical memory address of the read access request.

DETAILED DESCRIPTION

Figure 1:
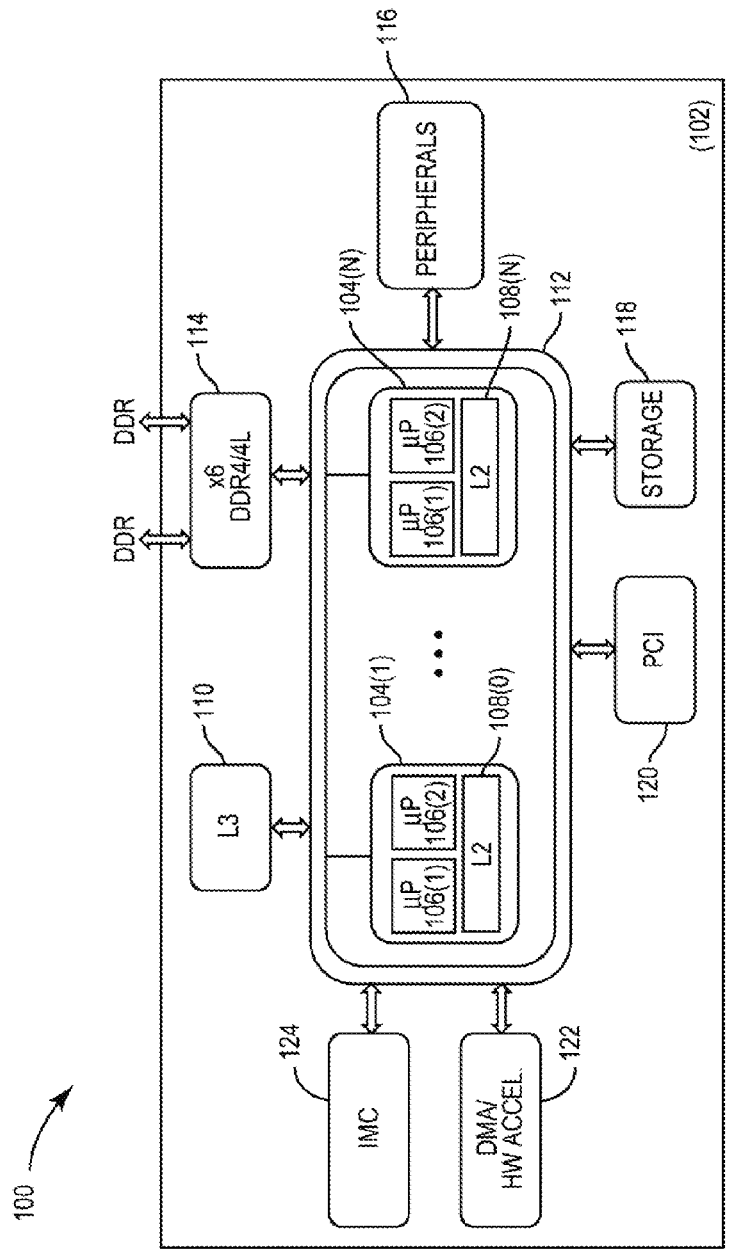
FIG. 1 is a schematic diagram of an exemplary system-on-a-chip ("SoC") that include a processor-based system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 2:
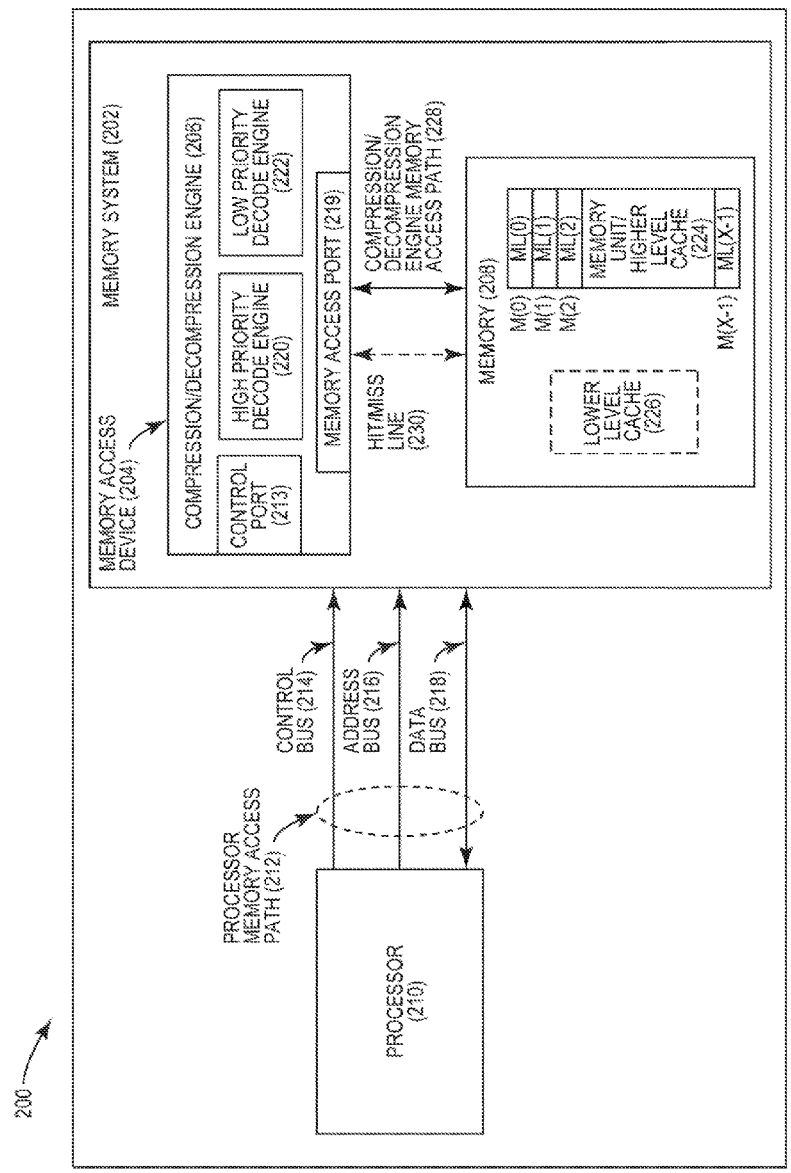
FIG. 2 is a block diagram of an exemplary processor-based system that includes a memory access device configured to provide priority-based access of compressed memory lines in a memory for reducing read access latency for higher priority read access requests.

In this regard, FIG. 2 is a block diagram of an exemplary processor-based system 200. Before discussing the exemplary aspects of priority-based access of compressed memory lines in the processor-based system 200, a description of exemplary components of the processor-based system 200 is first provided below.

In this regard, the processor-based system 200 includes a memory system 202, including a memory access device 204 configured to provide priority-based access of compressed memory lines in a memory for reducing read access latency for higher priority read access requests. For example, the memory access device 204 could be included in a memory controller for the memory system 202. In this example, the memory access device 204 in the processor-based system 200 is provided in the form of a compression/decompression engine 206 in this example. The compression/decompression engine 206 is configured to provide priority-based access of compressed memory lines stored in memory lines ML(0)-M(X−1) of memory locations M(0)-M(X−1) in a memory 208 for reducing read access latency for higher priority read access requests, where 'X' represents any number of memory locations provided in memory 208. The processor-based system 200 further includes a processor 210. The processor 210 is configured to execute program instructions stored in memory 208 or otherwise utilize data stored in memory 208 to perform processor-based functionality.

The processor 210 communicates with the memory system 202 through a processor memory access path 212. The compression/decompression engine 206 includes a control port 213 configured to receive read access requests and write access requests from the processor 210 through the processor memory access path 212. The processor memory access path 212 includes a control bus 214 for controlling access to the memory system 202, an address bus 216 to provide an address corresponding to a memory access, and a data bus 218, for exchange data with the memory system 202. The compression/decompression engine 206 is configured to control memory read/write accesses to memory 208. Accordingly, the compression/decompression engine 206 further includes a memory access port 219 providing access to memory 208. For example, the compression/decompression engine 206 is configured to retrieve data from memory 208 through the memory access port 219, decompress the retrieved data if compressed, and provide the retrieved data to an external device, such as processor 210. The compression/decompression engine 206 is further configured to compress data received from an external device, such as processor 210, and store the data in memory 208 through the memory access port 219. However, in other aspects, the processor may operate as a memory access device 204 and perform memory read/write accesses directly to memory 208 through the processor memory access path 212.

With continuing reference to FIG. 2, the compression/decompression engine 206 includes a high priority decode engine 220 configured to read in higher priority data from memory 208. The compression/decompression engine 206 also includes a low priority decode engine 222 configured to read in lower priority memory lines from memory 208.

In the exemplary processor-based system 200, memory 208 includes a memory unit 224 that stores compressed memory lines. Memory unit 224 includes X physical memory locations M(0)-M(X−1), each physical memory location M configured to store a memory line ML of a predetermined size of data, for example, sixty four (64) bytes. The compressed memory lines may be stored in memory unit 224 by the compression/decompression engine 206 through a compression/decompression engine memory access path 228. As noted above, in other aspects, the compressed memory lines may be stored in memory unit 224 by the processor 210 through the processor memory access path 212.

In an exemplary aspect, each physical memory location M stores in each memory line ML a first compressed memory line and a portion of a second compressed memory line. The portion of the second compressed memory line is stored in "holes" left in the corresponding memory line ML(0)-ML(X−1) by the compression of the first memory line. This allows memory unit 224 to store more than X compressed memory lines in the X memory lines ML(0)-ML(X−1) of the X physical memory locations M(0)-M(X−1) of memory unit 224.

In one exemplary aspect, memory 208 may operate as a multi-level cache memory, wherein one or more cache levels of the multi-level cache may store uncompressed memory lines previously accessed from memory unit 224 for faster read access. In this regard, memory 208 may include an optional lower level cache 226 that stores uncompressed memory lines, and memory unit 224 may operate as a higher level cache memory that stores compressed memory lines. The optional lower level cache 226 may receive address information from the address bus 216 and may exchange hit/miss information with the compression/decompression engine 206 through an optional hit/miss line 230. In this regard, if a memory address of a read access request results in a cache hit at the optional lower level cache 226, the optional lower level cache 226 signals the compression/decompression ending 206 accordingly through the optional hit/miss line 230 and provides the requested data to the processor 210 through the data bus 218. However, if the logical memory address of the read access request results in a cache miss at the optional lower level cache 226, the optional lower level cache 226 signals the compression/decompression engine 206 accordingly through the optional hit/miss line 230. The compression/decompression engine 206 then accesses the requested data by accessing a corresponding compressed memory line ML at memory unit 224, decompressing the compressed memory line, and storing the decompressed data in the optional lower level cache 226. The optional lower level cache 226 then provides the requested data to the processor 210 through the data bus 218. For simplicity, and not as limitation, memory 208 will be described from this point forward as only including memory unit 224.

To provide for priority-based access of compressed memory lines in memory 208 in the processor-based system 200, in one exemplary aspect, the compression/decompression engine 206 receives a read access request to access data from memory 208. The requested data is of a predetermined size, and each of the addressable physical memory locations M(0)-M(X-1) in memory 208 is configured to store a corresponding memory line ML(0)-ML(X-1) of the predetermined size. Each memory line ML(0)-ML(X-1) is configured to include a first compressed memory line comprising a compressed higher priority memory line and a portion of the second compressed memory line comprising a portion of a compressed lower priority memory line. This allows memory 208 to store up to X compressed higher priority memory lines, each within a memory line ML(0)-ML(X-1) of a corresponding physical memory location M(0)-M(X-1), and therefore, to store each of the up to X compressed higher priority memory lines in a physical memory location M(0)-M(X-1) of memory 208 corresponding to a logical memory address of the corresponding higher priority data. Further, this allows memory 208 to store additional compressed memory lines, i.e., compressed lower priority memory lines, within the X physical memory locations M(0)-M(X-1) of memory 208, thus increasing capacity of memory 208 without increasing the size of memory 208. Accordingly, in the exemplary aspect, the compression/decompression engine 206 can access higher priority data in memory 208 with reduced latency, while increasing the capacity of memory 208.

In that regard, in this example, upon receiving a read access request through the processor memory access path 212, the compression/decompression engine 206 determines a priority of the read access request. If the read access request is a higher priority read access request, the compression/decompression engine 206 uses a logical memory address of the read access request in the address bus 216 as the physical memory address to access a physical memory location M(0)-M(X-1) that contains the requested higher priority data. The physical memory location M(0)-M(X-1) in memory 208 contains a memory line ML(0)-ML(X-1) that includes a compressed higher priority memory line corresponding to the read access request in compressed form. In this manner, latency associated with translation of the logical memory address of the higher priority read access request to the corresponding physical memory address M(0)-M(X-1) in memory 208 is not required to access the required higher priority data from memory 208. The compression/decompression engine 206 decompresses the compressed higher priority data, and the memory system 202 provides the requested higher priority data to the processor 210 via the data bus 218.

On the other hand, if the read access request is a lower priority read access request, the compression/decompression engine 206 translates the logical memory address of the read access request into a physical memory address to access contiguous memory locations M(0)-M(X-1) that store the requested lower priority data. Each of the contiguous physical memory locations M(0)-M(X-1) contains a hole left by the compression of corresponding higher priority data, and the holes combine to store a memory line ML(0)-ML(X-1) that includes the requested lower priority data in compressed form. Thus, the compression/decompression engine 206 can decompress the compressed lower priority data and provide the requested lower priority data via the data bus 218. In this manner, although translation of the logical memory address for the read access request is required, such translation is limited to lower priority read access requests, thus providing a higher overall memory access efficiency of compressed memory lines in the processor-based system 200. Further, compressed lower priority memory lines are stored in holes left by the compression of the higher priority data, thus increasing memory capacity without increasing memory size.

Figure 3:
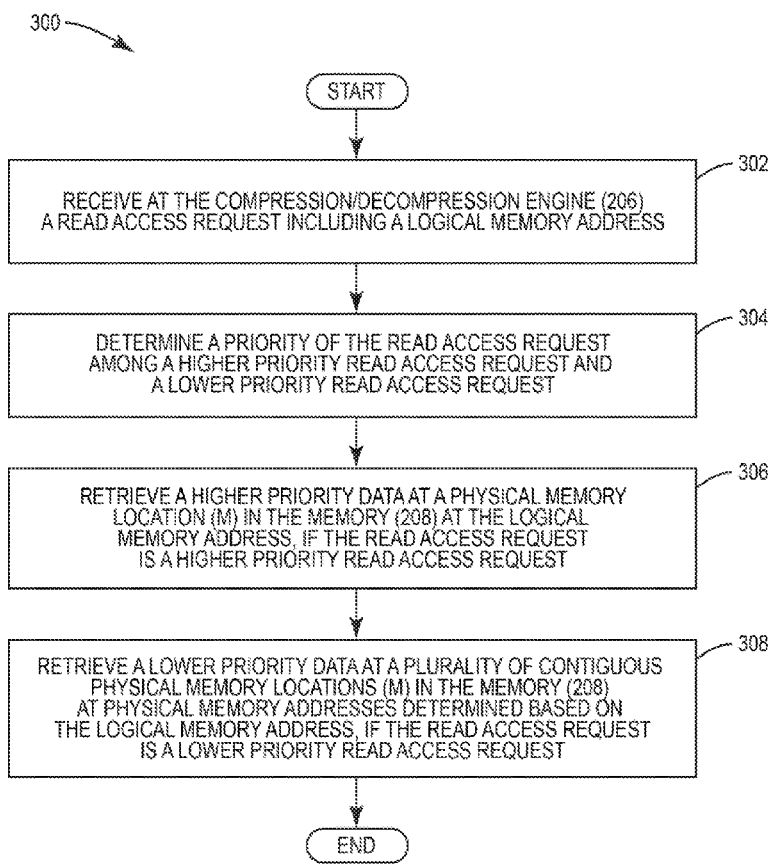
FIG. 3 is a flowchart illustrating an exemplary process for priority-based read access of compressed memory lines in the memory in the processor-based system in FIG. 2 for reducing read access latency for higher priority read access requests.

FIG. 3 is a flowchart illustrating an exemplary process 300 of the compression/decompression engine 206 performing a priority-based read access request of compressed memory lines in memory 208 in the processor-based system 200 in FIG. 2 for reducing read access latency. As discussed above, in the example of the processor-based system 200, the compression/decompression engine 206 is called upon to perform the memory read request when the memory 208 does not include the optional lower level cache 226 or if a miss occurs at the optional lower level cache 226 when the optional lower level cache is included. In the exemplary process 300, the compression/decompression engine 206 is configured to receive a read access request from the processor 210 through the processor memory access path 212 (block 302). The read access request includes a logical memory address, provided through the address bus 216, for accessing a physical memory location M(0)-M(X-1) in memory 208. The compression/decompression engine 206 is further configured to determine a priority of the read access request among a higher priority read access request and a lower priority read access request (block 304). The compression/decompression engine 206 is further configured to retrieve through the compression/decompression engine memory access path 228 a higher priority data stored at a physical memory location M(0)-M(X-1) in memory 208 at the logical memory address of the read access request, if the read access request is a higher priority read access request (block 306). The compression/decompression engine 206 is further configured to retrieve through the compression/decompression engine memory access path 228 a lower priority data stored at a plurality of contiguous physical memory locations M(0)-M(X-1) in memory 208, determined based on the logical memory address of the read access request, if the read access request is a lower priority read access request (block 308).

Accordingly, the exemplary process 300 for priority-based read access of compressed memory lines in memory 208 does not require a translation of a logical memory address of a higher priority read access request to the corresponding physical memory address. This can obviate the need to employ and access metadata in memory 208 or other memory and/or employ indexing to perform a translation, and the associated latency. Therefore, by storing the most frequently used data in higher priority memory lines, for example, these exemplary aspects result in a higher overall memory access efficiency in the processor-based system 200 than in systems where translation of the logical memory address of the requested data is required for access regardless of their priority.

The priority-based access of compressed memory lines in memory 208 in the processor-based system 200 discussed above can be supported by a plurality of pre-determined configuration characteristics of memory 208. These pre-determined configuration characteristics may include a location of compressed memory lines in a memory line ML(0)-ML(X-1) based on the parity of the corresponding address and the priority of the compressed memory line, and the size of memory 208. The compression/decompression engine 206 may use these pre-determined configuration characteristics to efficiently retrieve data from memory 208. For example, the compression/decompression engine 206 needs to know the priority of the compressed memory line and the size of memory 208 to determine the physical memory location M(0)-M(X−1) of a compressed lower priority memory line including a requested lower priority data.

Figure 4:
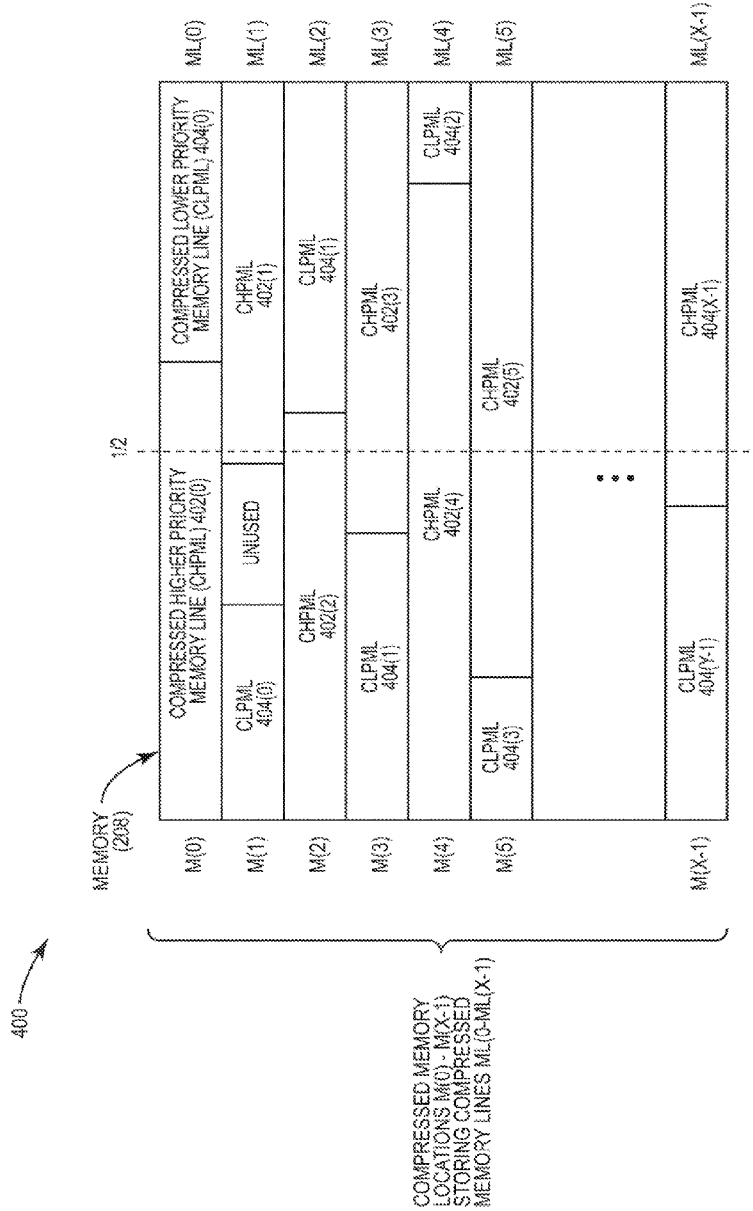
FIG. 4 is a diagram illustrating an exemplary memory configuration of stored compressed memory lines for higher priority data and lower priority data in the memory in the processor-based system illustrated in FIG. 2.

In this regard, FIG. 4 is a diagram illustrating an exemplary memory configuration 400 of stored compressed memory lines for higher priority data and lower priority data in memory 208 in the processor-based system 200 illustrated in FIG. 2. As noted with respect to memory 208 in FIG. 2, and in particular with respect to memory unit 224 within memory 208, memory 208 includes X physical memory locations M(0)-M(X−1), each of physical memory locations M(0)-M(X−1) configured to store a memory line ML(0)-ML(X−1) of a predetermined size, for example, 64 bytes. In the exemplary memory configuration 400, each of physical memory locations M(0)-M(X−1) is capable of storing a memory line ML(0)-ML(X−1) that includes a compressed higher priority memory line 402 (shown as CHPML 402 in FIG. 4). Further, each of physical memory locations M(0)-M(X−1) is capable of storing a portion of a compressed lower priority memory line (shown as CLPML 404 in FIG. 4) filling at least partially a hole left in the physical memory location M(0)-M(X−1) by compression of the corresponding compressed higher priority memory line 402. Memory 208 stores up to X compressed higher priority memory lines 402(0)-402(X−1). Each compressed higher priority memory line 402 is placed in a corresponding memory line ML(0)-ML(X−1) and stored in a corresponding physical memory location M(0)-M(X−1) that matches the logical memory address of the corresponding uncompressed higher priority memory line, i.e., the corresponding higher priority data. This configuration characteristic allows each compressed higher priority memory line 402 to be accessed by reading only one memory line ML(0)-ML(X−1) from a corresponding physical memory location M(0)-M(X−1) in memory 208. However, to take advantage of this configuration characteristic, the compression/decompression engine 206 needs to determine that a read access request is a higher priority access request.

In this regard, the compression/decompression engine 206 is configured to determine that a read access request is a higher priority read access request by determining that the logical memory address of the read access request is within a higher priority address range that extends from 0 to X−1. In detail, as noted above, memory 208 includes X physical memory locations M(0)-M(X−1). In one exemplary aspect, each of physical memory locations M(0)-M(X−1) includes one compressed higher priority memory line 402 that can be accessed using the logical memory location of the read access request as a physical memory location M(0)-M(X−1). Thus, in the exemplary memory configuration 400, the compressed higher priority memory lines 402 are stored in the lower X physical memory locations M(0)-M(X−1). Accordingly, in one exemplary aspect, the higher priority address range is from 0 to X−1, and the compression/decompression engine 206 can determine that a read access request is a higher priority read access request by determining that the logical memory address of the read access request falls between 0 and X−1.

In this example, using the logical memory address of the read access request to indicate the priority of the read access request obviates the need to access a metadata in memory 208 or other memory to determine that the received read access request is a higher priority access request. Furthermore, because each logical memory address corresponds to one of a compressed higher priority memory line 402 or a compressed lower priority memory line 404, the compression/decompression engine 206 is further configured to determine that a read access request is a lower priority read access request by determining that the logical memory address of the read access request falls outside the higher priority address range. For a lower priority read access request however, the compression/decompression engine 206 needs to determine the physical memory locations M(0)-M(X−1) including the requested lower priority data, i.e., the corresponding compressed lower priority memory line 404, using a translation of the logical memory address of the read access request.

In this regard, in one aspect, each compressed lower priority memory line 404 is stored in the memory configuration 400 such that a corresponding physical memory location M(0)-M(X−1) can be derived from the logical memory address of the lower priority read access request. In particular, it is noted that in this particular example the data is stored in memory 208 such that one compressed lower priority memory line 404 of compressed lower priority memory lines 404 is stored for every two compressed higher priority memory lines 402, thus providing a fifty percent (50%) increase in memory capacity from X physical memory locations to X+Y logical memory locations, where Y is X/2. Accordingly, in this aspect, the lower two thirds of the logical memory locations, i.e. logical memory addresses (0)-(X−1), are allocated to compressed higher priority memory lines 402(0)-402(X−1) and the upper one third of the logical memory locations, i.e., logical memory locations (X)-(X+Y−1), is allocated to compressed lower priority memory lines 404(0)-404(Y−1). Furthermore, each compressed lower priority memory line 404 is stored in two contiguous physical memory locations of physical memory locations M(0)-M(X−1). Accordingly, the configuration characteristic of the memory configuration 400 allows determination of the first physical memory location M(q) of a plurality of physical memory locations M(0)-M(X−1) that store a corresponding compressed lower priority memory line 404 based on the value X and the corresponding logical memory location of the read access request by the following formula:

$$q=2*(\text{lma}-X),$$

where lma is the logical memory address of the read access request and X is the number of physical memory locations M in memory 208.

For example, if memory 208 includes five hundred twelve (512) physical memory locations M(0)-M(511), memory 208 can store 512 compressed higher priority memory lines 402(0)-402(511) and 512/2=256 compressed lower priority memory lines 404(0)-404(255), for a total capacity of 512+256=768 logical memory locations in memory 208. Further, if the logical memory address of the read access request is five hundred fourteen (514), the physical memory address q is 2*(514−512)=4. Thus, the compressed lower priority memory line 404 corresponding to the logical memory address 514 of the read access request is at contiguous physical memory locations M(0)-M(X−1) beginning at physical memory location M(4), i.e., CLPML 404(2) in FIG. 4. Thus, this exemplary aspect requires translation of the logical memory address 514 to the corresponding contiguous physical memory locations M(4)-M(5). However, the translation only requires a simple computation based on pre-determined and already available values, which obviates the need to access metadata in memory 208 or other memory to perform the translation, and the associated latency.

Accordingly, the configuration characteristics of the memory configuration 400 allow the compression/decompression engine 206 to determine the physical memory location M(0)-M(X−1) of each compressed lower priority memory line 404 therein based on the logical memory address received in the read access request and the number of physical memory locations X in memory 208. However, because each physical memory location M(0)-M(X-1) stores a memory line ML(0)-ML(X-1) including a compressed higher priority memory line 402 and a portion of a compressed lower priority memory line 404, the compression/decompression engine 206 needs additional information to retrieve the requested data from the corresponding memory line ML(0)-ML(X-1). In this regard, in one exemplary aspect, each compressed higher priority memory line 402 is stored at an edge of a corresponding physical memory location M(0)-M(X-1) based on the parity of the corresponding physical memory address, and each compressed lower priority memory line 404 is stored between consecutive compressed higher priority memory lines 402, each portion of each compressed lower priority memory line 404 being stored at an edge of a corresponding physical memory location M(0)-M(X-1) to occupy up to half of the corresponding physical memory location M(0)-M(X-1). As will be explained in detail below, this facilitates retrieval of each compressed memory line by a single memory access to memory 208.

In this regard, in the memory configuration 400, the compressed higher priority memory lines 402 and the compressed lower priority memory lines 404 are stored such that when a physical memory address of a corresponding physical memory location M(0)-M(X-1) is even, the compressed higher priority memory line 402 is stored on the left edge of a memory line ML(0)-ML(X-1) stored at the corresponding physical memory location M(0)-M(X-1), and when a physical memory address of a corresponding physical memory location M(0)-M(X-1) is odd, the compressed higher priority memory line 402 is stored on the right edge of the memory line ML(0)-ML(X-1) stored at the corresponding memory location M(0)-M(X-1). For example, in memory configuration 400 in FIG. 4, the compressed higher priority memory line 402(0), which is stored at physical memory location M(0), is stored at the left edge of the physical memory location M(0) because the physical memory address (0) is even. Further, the compressed higher priority memory line 402(1), which is stored at physical memory location M(1), is stored at the right edge of the physical memory location M(1) because the physical memory address (1) is odd. This allows the compressed lower priority memory line 404(0) to be stored between the compressed higher priority memory line 402(0) and the compressed higher priority memory line 402(1) such that a first portion of the compressed lower priority memory line 404(0) is stored at a hole on the right side of the physical memory location M(0) and a second portion of the compressed lower priority memory line 404(0) is stored contiguously at a hole on the left side of the physical memory location M(1). Further, as illustrated in memory configuration 400, the first and second portions of compressed lower priority memory line 404(0) do not occupy more than half of their corresponding memory lines ML(0)-ML(X-1). These configuration characteristic of the memory configuration 400 allow for the entire compressed lower priority memory line 404(0) to be accessed at memory 208 in a single memory access beginning at a half-cache line point of physical memory location M(0). Accordingly, the memory configuration 400 of memory 208 allows the compression/decompression engine 206 to access any of the compressed higher priority memory lines 402 and the compressed lower priority memory lines 404 in a single memory access of memory 208.

Figure 5:
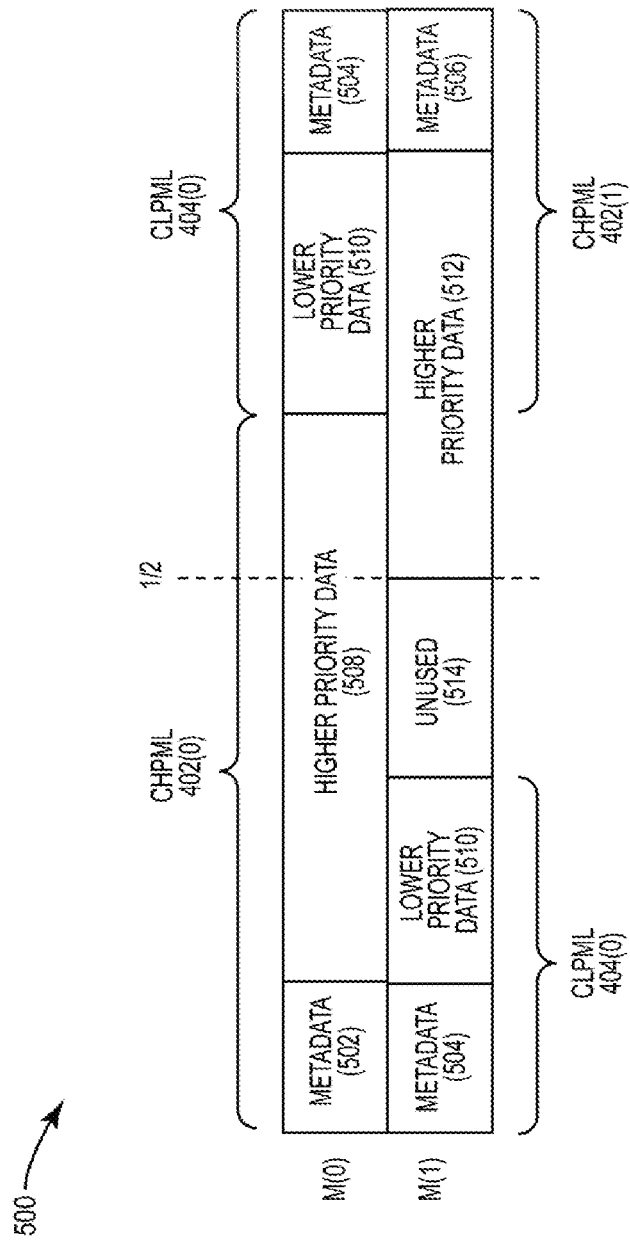
FIG. 5 is a diagram illustrating more exemplary detail of a memory configuration of stored compressed memory lines in the exemplary memory configuration illustrated in FIG. 4.

To retrieve a compressed memory line from a physical memory location M(0)-M(X-1) in memory 208 however, corresponding metadata is used in this example, to determine the boundaries of the compressed memory lines therein. In this regard, FIG. 5 is a diagram illustrating in detail an exemplary memory configuration 500 of stored compressed higher priority memory lines 402(0) and 402(1), and compressed lower priority memory line 404(0) in the memory configuration 400 for memory 208 illustrated in FIG. 4. Each of the compressed higher priority memory lines 402(0) and 402(1) and the compressed lower priority memory line 404(0) includes corresponding metadata 502, 504, and 506, respectively, that indicates, for example, whether the corresponding compressed memory line includes an exception. Exceptions will be described below with reference to FIG. 6. Each metadata 502, 504, and 506 is located at the edge of a corresponding physical memory location M(0)-M(X-1) within their corresponding compressed memory lines, allowing the compression/decompression engine 206 to retrieve the metadata from the corresponding compressed memory line of compressed memory lines 402(0), 404(0), 402(1), respectively. Further, each of the compressed memory lines 402(0), 402(1), 404(0) is configured to include higher priority data 508, lower priority data 510, and higher priority data 512, respectively, as shown. In the memory configuration 500, the physical memory location M(1) further includes an unused section 514. In this regard, any physical memory location M(0)-M(X-1) may include an unused section 514 when the compressed higher priority memory line 402 and the compressed lower priority memory line 404 therein do not fully occupy the entire physical memory location M(0)-M(X-1).

The configuration characteristics of the memory configuration 500 thus allow the compression/decompression engine 206 to determine the physical memory address M(0)-M(X-1) including a desired compressed memory line of compressed memory lines 402, 404 by simple computation based on the logical memory address of a read access request and the number of physical memory locations X of memory 208, without the need to access additional metadata. For example, with references to FIGS. 2-5, upon receiving a read access request including a logical memory address (block 302 of FIG. 3), the compression/decompression engine 206 determines the priority of the read access request based on the logical memory address. If the logical memory address is (0), and if memory 208 includes 512 physical memory locations, the compression/decompression engine 206 determines that the read access request is a higher priority read access request. This is because the logical memory address is lower than the number of physical memory locations M(0)-M(X-1) of memory 208, and therefore, is within the predetermined higher priority address range of memory 208. The compression/decompression engine 206 then uses the logical memory address of the read access request (0) as the physical memory address (0) of the corresponding compressed memory line ML(0) to retrieve the compressed higher priority memory line 402(0) from the physical memory location M(0). Further, because the physical memory address (0) is even, the compression/decompression engine 206 determines that the compressed higher priority memory line 402(0) is on the left edge of the physical memory location M(0). The compression/decompression engine 206 then retrieves the higher priority metadata 502 from the left edge of the compressed higher priority memory line 402(0) and a length N. The compression/decompression engine 206 then retrieves the higher priority data 508 from the compressed higher priority memory line 402(0), decompresses the higher priority data 508 if compressed, and provides the uncompressed higher priority data to the processor 210 through the data bus 218.

As described above, each physical memory location M(0)-M(X-1) can store up to a predetermined size of data. Further, in the exemplary memory configuration 500 illustrated in FIG. 5, each physical memory location M(0)-M(X-1) includes a compressed higher priority memory line 402 and a portion of a compressed lower priority memory line 404, each compressed memory line of compressed memory lines 402, 404 including a corresponding metadata field and a corresponding compressed data field. This limits the space allocated to, for example, the higher priority data. In an embodiment, for example, for a memory location M that can store sixty four (64) bytes, only sixty (60) bytes may be allocated to the higher priority data, as a minimum of four (4) bytes may be reserved for the higher priority metadata and the compressed lower priority memory line 404. However, the higher priority data may not be compressible to fit within the corresponding data field, causing an exception. In this regard, in an exemplary embodiment an additional memory location in an exception memory area is allocated to store a portion of the uncompressed higher priority data. In this manner, part of the higher priority data is stored uncompressed in the corresponding data field of the compressed higher priority memory line 402 and the rest is stored in the additional memory location. Thus, the compression/decompression engine 206 is configured to determine that an exception occurs and to process the exception by retrieving data from the compressed higher priority memory line 402 and the memory location in the exception area.

Figure 6:
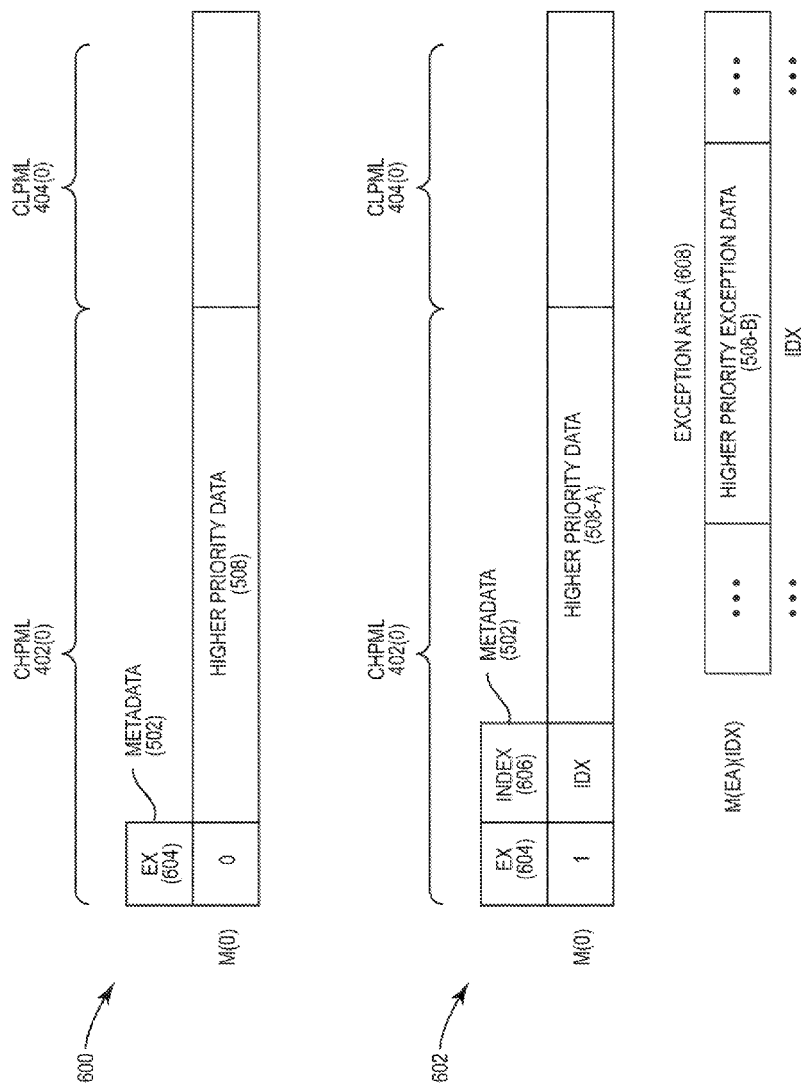
FIG. 6 is a diagram illustrating exemplary memory configurations to describe in further exemplary detail of the memory configuration that can be employed for the memory configuration in FIG. 5.

In this regard, FIG. 6 is a diagram illustrating memory configurations 600 and 602 to describe in detail aspects of the memory configuration 500 illustrated in FIG. 5. In particular, memory configurations 600 and 602 provide further detail of the higher priority metadata 502 of the compressed higher priority memory line 402(0) to illustrate the use of exceptions according to exemplary aspects. In this regard, the higher priority metadata 502 includes an exception flag 604 to indicate to the compression/decompression engine 206 whether the compressed higher priority memory line 402 includes an exception. Further, when the exception flag 604 indicates that the compressed higher priority memory line 402 includes an exception, the higher priority metadata 502 further includes an exception index 606 to indicate to the compression/decompression engine 206 the location of additional data in an exception area 608.

In this regard, in the memory configuration 600, the exception flag 604 is set to false (e.g., to '0'), indicating that compressed higher priority memory line 402(0) does not include an exception. Accordingly, in the memory configuration 600 in FIG. 6, the requested higher priority data is stored in compressed form as the higher priority data 508 and can be retrieved by the compression/decompression engine 206 accordingly. In memory configuration 602 however, the exception flag 604 is set to true (e.g., to '1'), indicating that compressed higher priority memory line 402(0) includes an exception. Further, because of the exception, the higher priority metadata 502 further includes the exception index 606 set to an index IDX. Accordingly, in the memory configuration 602 in FIG. 6, the requested higher priority data is stored in uncompressed form as a combination of the higher priority data 508-A at the physical memory location M(0) and the higher priority exception data 508-B at a physical memory location allocated for the exception area 608 M(EA), indexed by IDX. The compression/decompression engine 206 is therefore configured to retrieve the requested higher priority data accordingly.

In the exemplary aspect described above, the portions of higher priority data 508-A and 508-B are stored uncompressed. This allows the compression/decompression engine 206 to retrieve the requested higher priority data without the need to perform decompression or to determine the size of the retrieved data, which would be the predetermined size. This does not significantly affect memory capacity of memory 208, because as demonstrated by the use of an exception, the corresponding data does not compress well (i.e., compression does not provide a significant reduction in size). Accordingly, compression does not provide significant benefits. Further, the exception area may only need to store a known number of bytes, thus maximizing the usage of the exception area. For example, for a memory location M that can store sixty four (64) bytes, only sixty (60) bytes may be allocated to the higher priority data, as a minimum of four (4) bytes may be reserved for the higher priority metadata and the compressed lower priority memory line 404. Thus, a higher priority data that cannot be compressed to be less than 60 bytes will cause an exception. For such higher priority data, in the exemplary aspect, 60 bytes are stored uncompressed as the higher priority data 508-A, and only the remaining 4 bytes of the higher priority data are stored uncompressed as the higher priority exception data 508-B. Therefore, compression of data stored in the exception area does not significantly improve the memory capacity of memory 208 or of the memory in which the exception area resides.

Figure 7A:
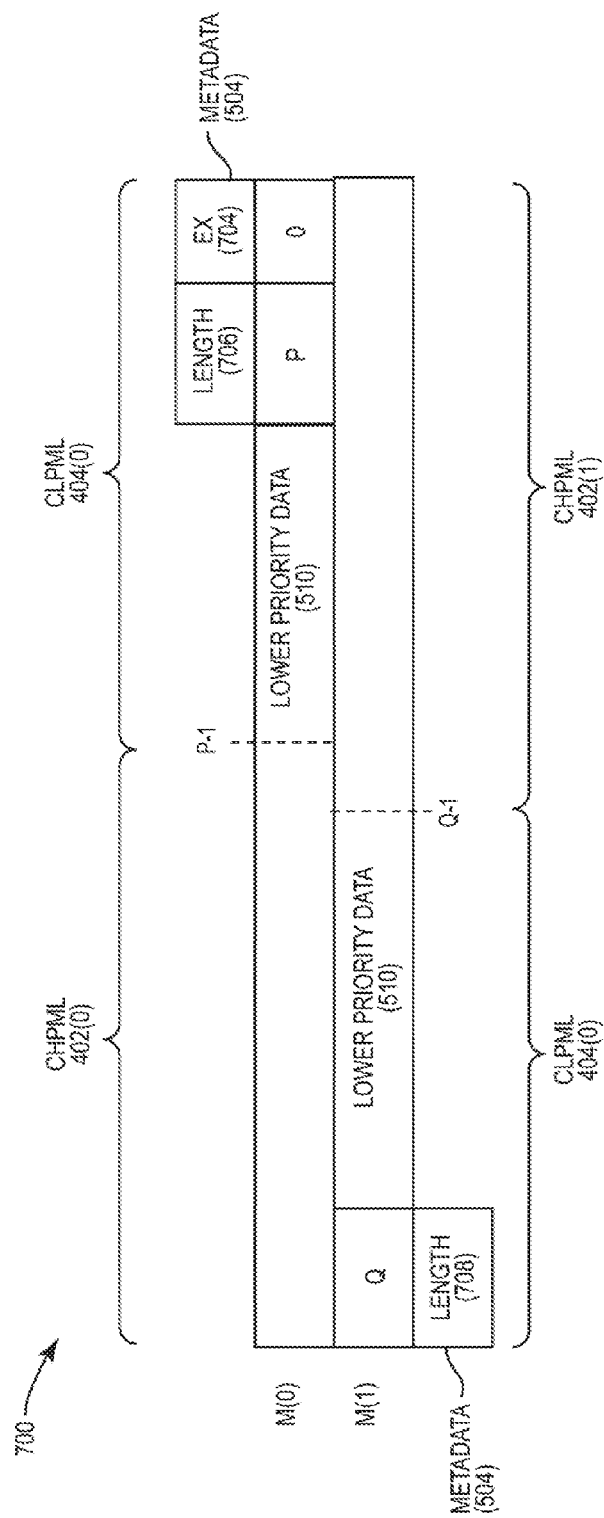
FIGS. 7A and 7B are diagrams for illustrating exemplary memory configurations to describe in further exemplary detail of the memory configuration that can be employed for the memory configuration in FIG. 5.
Figure 7B:
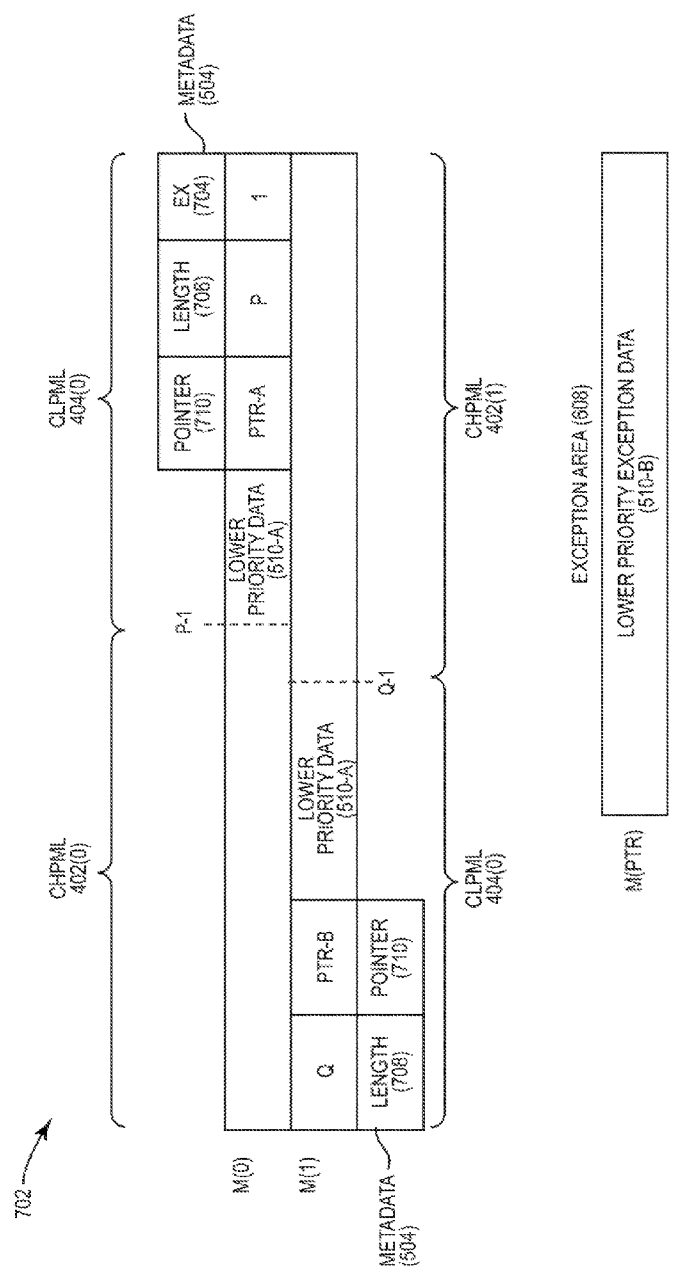

The exemplary aspect above provides memory configurations regarding the storing and reading of higher priority data and, particularly, of higher priority data exceptions. Lower priority data is stored and read to complement the storing and reading of higher priority data. In that regard, FIGS. 7A and 7B are diagrams illustrating exemplary memory configurations 700 and 702, respectively, to describe in detail further aspects of the exemplary memory configuration 500 illustrated in FIG. 5. In particular, memory configurations 700 and 702 provide further exemplary details of the lower priority metadata 504 of the compressed lower priority memory line 404(0) to illustrate the use of exceptions according to exemplary aspects. In this regard, the lower priority metadata 504 includes an exception flag 704, a length 706 for a first portion of the lower priority data 510 set to P, and a length 708 for a second portion of the lower priority data 510 set to Q. Further, the lower priority metadata 504 includes an exception pointer 710 when the exception flag 704 indicates that the corresponding compressed memory line includes an exception.

In this regard, in memory configuration 700 of FIG. 7A, the exception flag is false (e.g., '0'), indicating that compressed lower priority memory line 404(0) does not include an exception. Accordingly, in the memory configuration 700, the requested lower priority data is stored in compressed form as the lower priority data 510 at the contiguous physical memory locations M(0)-M(1) and can be retrieved by the compression/decompression engine 206 accordingly. In memory configuration 702 of FIG. 7B however, the exception flag 704 is set to true (e.g., '1'), and an exception pointer 710 is set to an address PTR, segmented as PTR-A and PTR-B. Accordingly, in the memory configuration 702, the requested lower priority data is retrieved by combining a portion of the lower priority data 510-A at the contiguous physical memory locations M(0)-M(1) and another portion of the lower priority exception data 510-B at a physical memory location M(PTR) in the exception area 608. In an exemplary aspect, the lower priority data is stored in compressed form even in the case of an exception. However, the lower priority data may be stored uncompressed.

Figure 8:
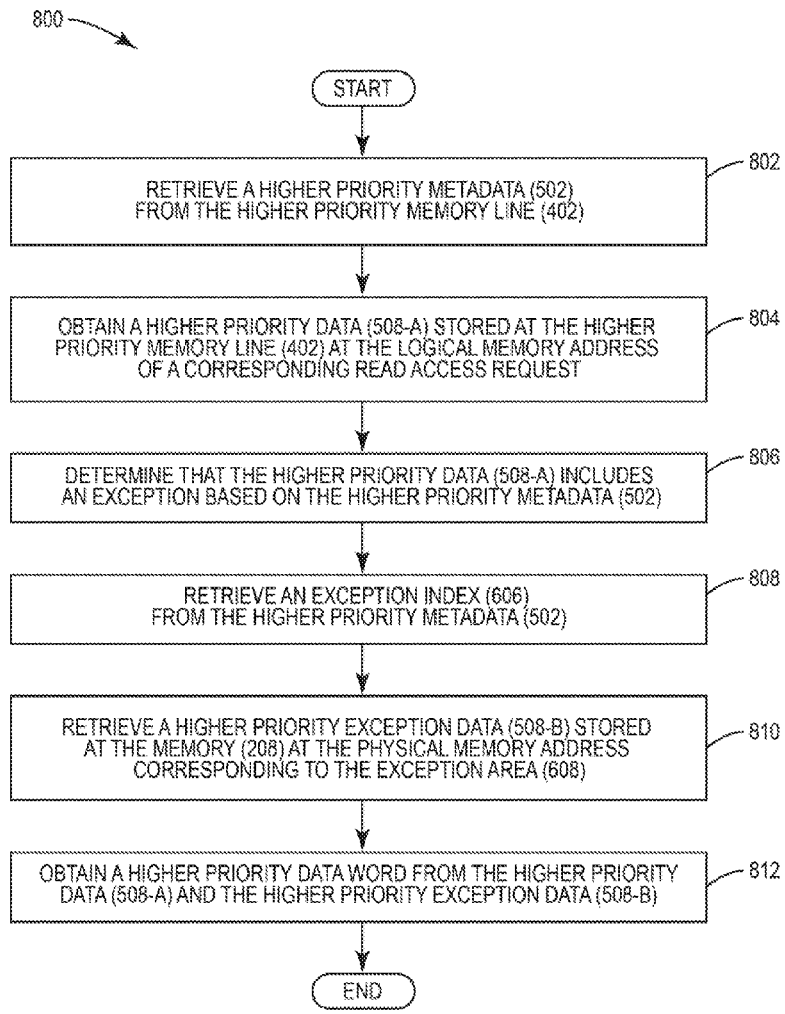
FIG. 8 is a flowchart illustrating an exemplary process for priority-based read access of a compressed higher priority memory line in the memory in the processor-based system illustrated in FIG. 2 when the compressed higher priority memory line indicates an exception.

In this regard, FIG. 8 is a flowchart illustrating an exemplary process 800 for priority-based read access of a compressed higher priority memory line 402 in memory 208 in the processor-based system 200 when the compressed higher priority memory line 402 indicates an exception. The exemplary process 800 relates to block 306 in FIG. 3 as it describes an exemplary process for retrieving a higher priority data at a physical memory location M(0)-M(X−1) in memory 208 at the logical memory address of a higher priority read access request (block 306) when the compressed higher priority memory line 402 therein indicates an exception.

In this regard, upon receiving a read access request that includes a logical memory address and determining that the read access request is a higher priority read access request (blocks 302-304 in FIG. 3), the compression/decompression engine 206 retrieves the higher priority metadata 502 from a physical memory location M(0)-M(X−1) of memory 208 (block 802). For example, with reference to FIG. 6, if the logical memory address is 0, then the compression/decompression engine 206 retrieves the compressed higher priority memory line 402(0) from M(0), and further, the exception flag 604 from the higher priority metadata 502. The compression/decompression engine 206 obtains a higher priority data from the compressed higher priority memory line 402 therein (block 804). The compression/decompression engine 206 then determines that the higher priority data includes an exception based on the higher priority metadata 502 (block 806). The compression/decompression engine 206 may determine this, for example, by reading the exception flag 604 in the higher priority metadata 502. The compression/decompression engine 206 then retrieves an exception index 606 from the higher priority metadata 502 (block 808) and retrieves a higher priority exception data 508-B stored at a physical memory address corresponding to the exception area, indexed by the exception index 606 (block 810). The compression/decompression engine 206 then obtains the requested higher priority data from the higher priority data 508-A and the higher priority exception data 508-B (block 812).

Figure 9:
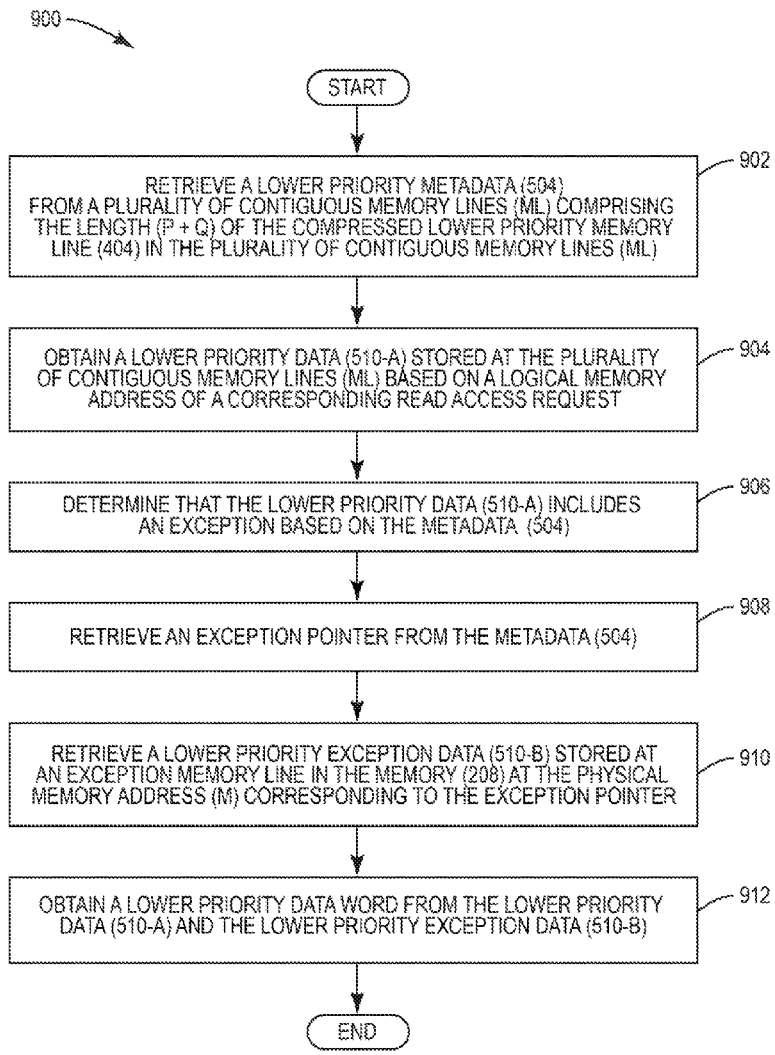
FIG. 9 is a flowchart illustrating an exemplary process for priority-based read access of a compressed lower priority memory line in the memory in the processor-based system illustrated in FIG. 2 when the compressed lower priority memory line indicates an exception.

Furthermore, FIG. 9 is a flowchart illustrating an exemplary process 900 for priority-based read access of a compressed lower priority memory line 404 in memory 208 in the processor-based system 200 when the compressed lower priority memory line 404 indicates an exception. The exemplary process 900 relates to block 308 in FIG. 3 as it describes an exemplary process for retrieving a lower priority data at a plurality of contiguous physical memory locations in memory 208 at physical memory addresses determined based on a logical memory address of a read access request.

In this regard, upon receiving a read access request that includes a logical memory address and determining that the read access request is a lower priority read access request (blocks 302-304 in FIG. 3), the compression/decompression engine 206 retrieves the lower priority metadata 504 from a physical memory location M(0)-M(X−1) of memory 208 that includes the length of the compressed lower priority memory line 404 therein (block 902). For example, with reference to FIG. 7B, if the logical memory address of the read access request is set to X, which translates into the physical memory address 0, the compression/decompression engine 206 retrieves the compressed lower priority memory line 404(0) from contiguous physical memory locations M(0)-M(1), and lengths P and Q from the lower priority metadata 504. The compression/decompression engine 206 uses the lengths P and Q to obtain a lower priority data from the compressed lower priority memory line 404 therein (block 904). For example, if the physical memory address is 0, the compression/decompression engine 206 uses the lengths P and Q to obtain the lower priority data 510-A from the compressed lower priority memory line 404(0) at contiguous physical memory locations M(0)-M(1). The compression/decompression engine 206 then determines that the lower priority data includes an exception based on the lower priority metadata 504 (block 906). The compression/decompression engine 206 may determine this, for example, by reading an exception flag 704 in the lower priority metadata 504. The compression/decompression engine 206 then retrieves an exception pointer 710 from the lower priority metadata 504 (block 908) and retrieves a lower priority exception data 510-B stored at an exception memory line in memory 208 at a physical memory address corresponding to the exception pointer M(PTR) (block 910). The compression/decompression engine 206 then obtains the requested lower priority data from the lower priority data 510-A and the lower priority exception data 510-B (block 912).

As noted earlier, the priority-based accessing of compressed memory lines in memory 208 in the processor-based system 200 can be supported by the configuration of compressed memory lines written into memory 208. In particular, each memory location M(0)-M(X−1) stores a compressed higher priority memory line 402 and at least a portion of a compressed lower priority memory line 404. In this regard, in one exemplary aspect, uncompressed higher priority data is compressed and stored in memory 208 such that the physical memory address of the memory location M(0)-M(X−1) storing the compressed higher priority memory line 402 including the compressed higher priority data matches the logical memory address of the uncompressed higher priority data. Further, uncompressed lower priority data is compressed and stored in memory 208 in holes left by the compression of the higher priority data. Accordingly, in the exemplary aspect, the compression/decompression engine 206 can access higher priority data in memory 208 with reduced latency, while increasing the capacity of memory 208. Further, in another exemplary aspect, compressed lower priority data may be stored such that physical memory addresses of the compressed lower priority data is determined by indexing the logical memory addresses of the uncompressed lower priority data, further increasing the overall memory access efficiency of compressed memory lines in the processor-based system 200 by obviating the need to access metadata in memory 208 to employ translation of the logical memory address to the corresponding physical memory address.

Figure 10:
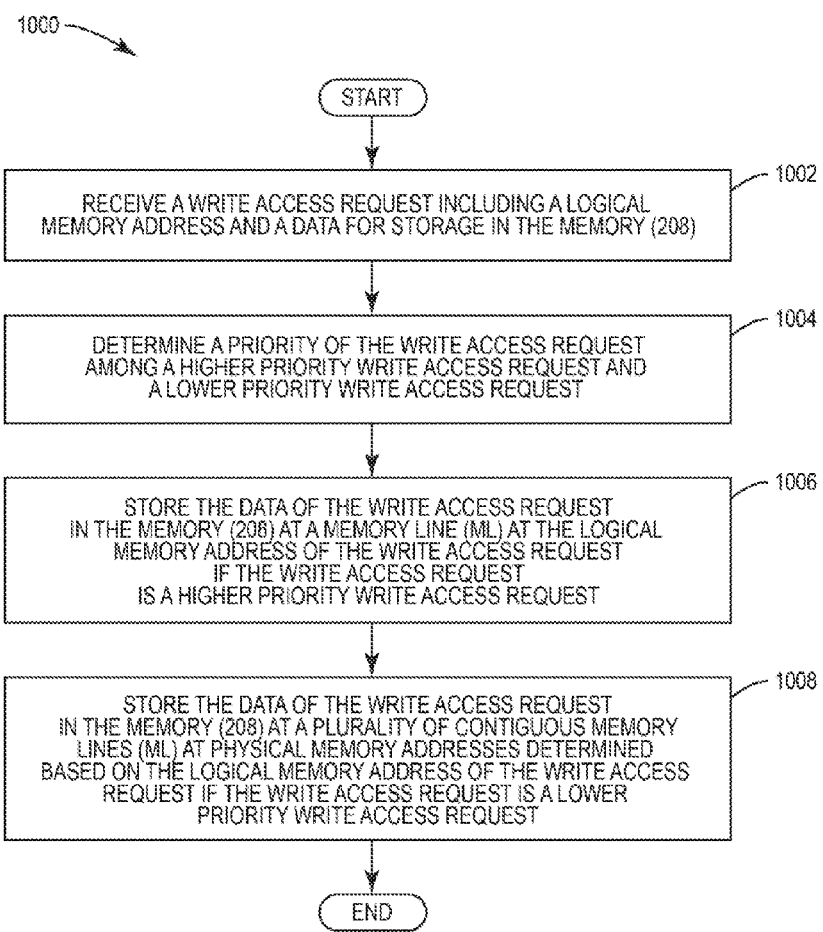
FIG. 10 is a flowchart illustrating an exemplary process for priority-based write access to compressed memory lines in the memory in the processor-based system illustrated in FIG. 2.

In this regard, FIG. 10 is a flowchart illustrating an exemplary process 1000 for priority-based write access of compressed memory lines in memory 208 in the processor-based system 200 illustrated in FIG. 2. In exemplary aspects, the process 1000 is performed by the compression/decompression engine 206 through the compression/decompression engine memory access path 228. The process 1000 can also be performed by the processor 210 through the processor memory access path 212 or by other processors (not shown) external to the processor-based system 200.

In this regard, in exemplary aspects, the compression/decompression engine 206 receives a write access request comprising a logical memory address through the address bus 216 and a data for storage in memory 208 through the data bus 218 (block 1002). The compression/decompression engine 206 determines a priority of the write access request among a higher priority write access request and a lower priority write access request (block 1004). The compression/decompression engine 206 then stores through the compression/decompression engine memory access path 228 the data of the write access request in memory 208 at a memory location M(0)-M(X−1) at the logical memory address of the write access request, if the write access request is a higher priority write access request (block 1006). If the write access request is a lower priority write access request however, the compression/decompression engine 206 stores the data of the write access request in memory 208 at a plurality of contiguous memory locations (M(0)-M(X−1)) in memory 208 at physical memory addresses determined based on the logical memory address of the write access request.

Figure 11:
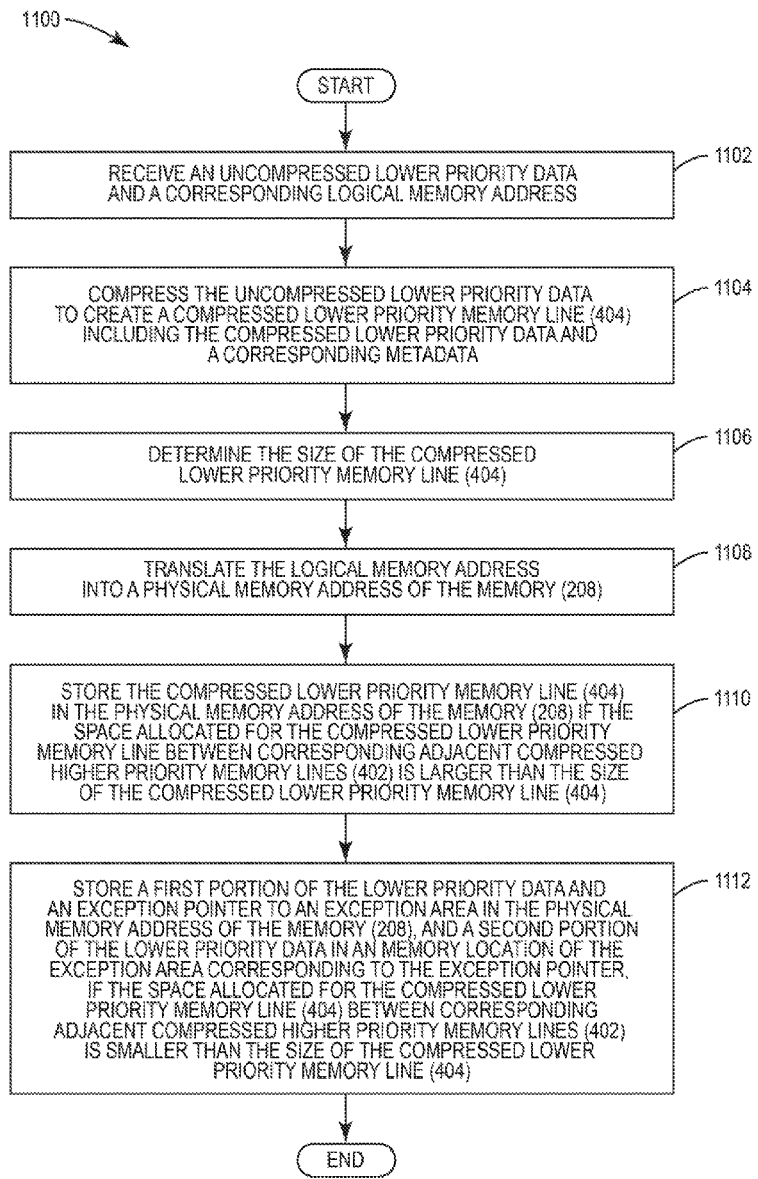
FIG. 11 is a flowchart illustrating further exemplary detail for a process for priority-based write access to lower priority compressed memory lines in the memory in the processor-based system illustrated in FIG. 2.

As noted above, if the write access request is a higher priority write access request, the compression/decompression engine 206 stores the higher priority data at a physical memory address of memory 208 that matches the logical memory address of a corresponding read access request. However, in one exemplary aspect, if the write access request is a lower priority write access request, the compression/decompression engine 206 must determine the appropriate holes in which to store the lower priority data. In this regard, FIG. 11 is a flowchart illustrating a detailed exemplary process 1100 for priority-based write access of lower priority compressed memory lines in memory 208 in the processor-based system 200 illustrated in FIG. 2. The compression/decompression engine 206 receives an uncompressed lower priority data (block 1102). The compression/decompression engine 206 compresses the uncompressed lower priority data to create a compressed lower priority memory line 404 (block 1104). The compressed lower priority memory line 404 includes a compressed lower priority data and a corresponding metadata. For example, with reference to FIG. 7A, the lower priority metadata 504 includes the length P+Q of the compressed lower priority memory line 404. The compression/decompression engine 206 determines the size of the compressed lower priority memory line 404 (block 1106) and translates the logical memory address into a physical memory address of memory 208. The compression/decompression engine 206 stores the compressed lower priority memory line 404 in contiguous physical memory locations beginning at physical memory location M(0)-M(X−1) at the physical memory address of memory 208 if the space allocated for the compressed lower priority memory line 404 between corresponding adjacent compressed higher priority memory lines 402 is larger than the size of the compressed lower priority memory line 404 (block 1110). For example, with reference to FIG. 7A, if the physical memory address is 0, the compression/decompression engine 206 stores the compressed lower priority memory line 404 at the physical memory locations M(0) and M(1) if the space between the compressed higher priority memory lines 402(0) and 402(1) is larger than the size of the compressed lower priority memory line 404(0).

On the other hand, the compression/decompression engine 206 stores a first portion of the lower priority data and an exception pointer to an exception area 608 in the physical memory address of memory 208, and a second portion of the lower priority data at a memory location of the exception area 608 corresponding to the exception pointer, if the space allocated for the compressed lower priority memory line 404 between corresponding adjacent compressed higher priority memory lines 402 is smaller than the size of the compressed lower priority memory line 404. For example, with reference to FIG. 7B, if the physical memory address is 0, the compression/decompression engine 206 stores a first portion of the lower priority data 510-A and an exception pointer PTR in the physical memory locations M(0) and M(1), and a second portion of the lower priority data 510-B in the exception area at the physical memory location M(PTR), if the space between the compressed higher priority memory lines 402(0) and 402(1) is smaller than the size of the compressed lower priority memory line 404(0).

The priority-based access of compressed memory lines in memory in a processor-based system according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 12:
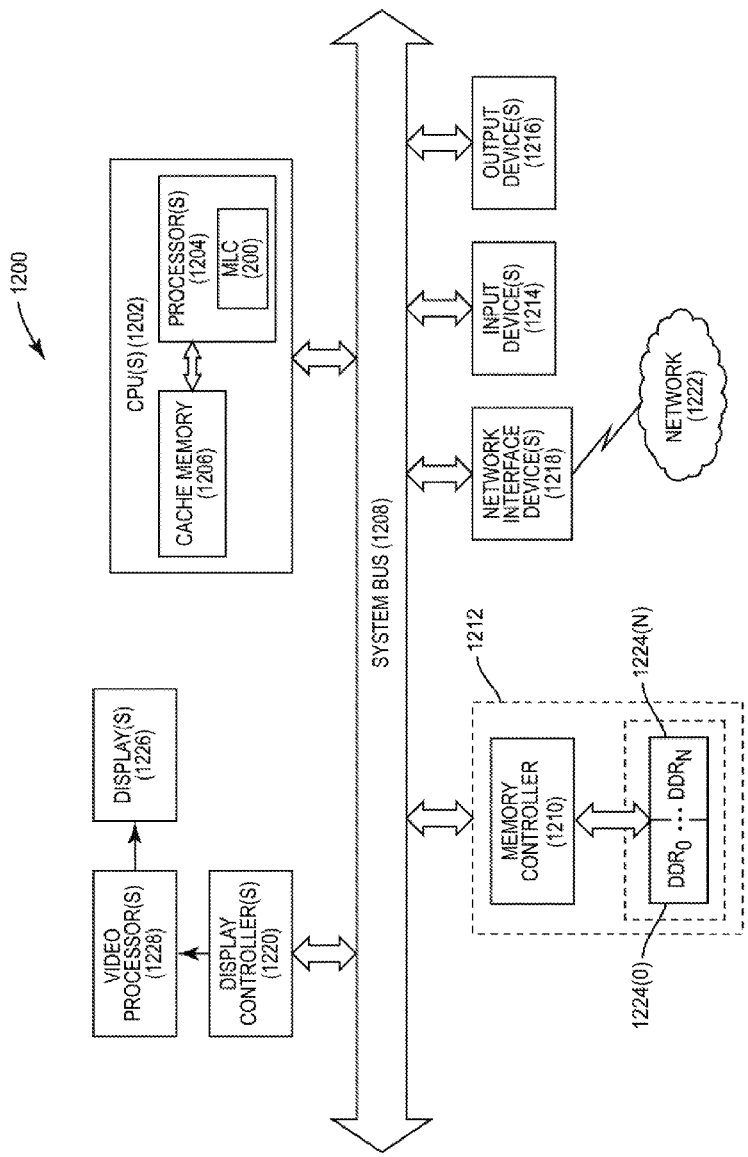
FIG. 12 is a block diagram of an exemplary processor-based system that can include a memory access device configured to provide priority-based access of compressed memory lines in the memory for reducing read access latency for higher priority read access requests.

In this regard, FIG. 12 is a block diagram of an exemplary processor-based system 1200 that can include the compression/decompression engine 206 illustrated in FIG. 2. In this example, the processor-based system 1200 includes one or more central processing units (CPUs) 1202, each including one or more processors 1204. The one or more processors 1204 may comprise the block-based computer processor 100 of FIG. 1. The CPU(s) 1202 may be a master device. The CPU(s) 1202 may have cache memory 1206 coupled to the processor(s) 1204 for rapid access to temporarily stored data. The CPU(s) 1202 is coupled to a system bus 1208 and can intercouple master and slave devices included in the processor-based system 1200. As is well known, the CPU(s) 1202 communicates with these other devices by exchanging address, control, and data information over the system bus 1208. For example, the CPU(s) 1202 can communicate bus transaction requests to a memory controller 1210 as an example of a slave device.

Other master and slave devices can be connected to the system bus 1208. As illustrated in FIG. 12, these devices can include a memory system 1212, one or more input devices 1214, one or more output devices 1216, one or more network interface devices 1218, and one or more display controllers 1220, as examples. The input device(s) 1214 can include any type of input device, including but not limited to input keys, switches, voice processors, etc. The output device(s) 1216 can include any type of output device, including, but not limited to, audio, video, other visual indicators, etc. The network interface device(s) 1218 can be any devices configured to allow exchange of data to and from a network 1222. The network 1222 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1218 can be configured to support any type of communications protocol desired. The memory system 1212 can include one or more memory units 1224(0-N).

The CPU(s) 1202 may also be configured to access the display controller(s) 1220 over the system bus 1208 to control information sent to one or more displays 1226. The display controller(s) 1220 sends information to the display(s) 1226 to be displayed via one or more video processors 1228, which process the information to be displayed into a format suitable for the display(s) 1226. The display(s) 1226 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory access device for accessing a memory line stored in a memory in a processor-based system, comprising:
   a control port configured to receive a read access request comprising a first logical memory address; and
   a memory access port configured to access the memory;
   the memory access device configured to:
      determine a priority of the read access request among a higher priority read access request and a lower priority read access request;
      in response to determining that the read access request is a higher priority read access request, retrieve through the memory access port, a first compressed higher priority memory line from the memory at the first logical memory address of the read access request; and
      in response to determining that the read access request is a lower priority read access request, retrieve through the memory access port, a first compressed lower priority memory line from the memory at a plurality of physical memory addresses determined based on the first logical memory address of the read access request.

2. The memory access device of claim 1 further configured to, based on determining that the read access request is a higher priority read access request:
   retrieve higher priority metadata of the first compressed higher priority memory line; and
   retrieve higher priority data from the first compressed higher priority memory line based on the higher priority metadata.

3. The memory access device of claim 2 further configured to, based on determining that the read access request is a higher priority read access request, retrieve the first compressed higher priority memory line from an end of a corresponding memory location based on a parity of the first logical memory address and the higher priority metadata.

4. The memory access device of claim 2 further configured to retrieve the higher priority data from the first compressed higher priority memory line by being configured to:
   determine that the first compressed higher priority memory line comprises an exception based on the higher priority metadata;

retrieve an exception index from the higher priority metadata;
retrieve, through the memory access port, higher priority exception data stored at an exception memory location in the memory at a physical memory address corresponding to the exception index; and
retrieve the higher priority data from the first compressed higher priority memory line and the higher priority exception data.

5. The memory access device of claim 1, further configured to determine that the read access request is a higher priority read access request, by being configured to determine that the first logical memory address of the read access request is within a predetermined higher priority address range.

6. The memory access device of claim 1 further configured to:
based on determining that the read access request is a lower priority read access request, retrieve the first compressed lower priority memory line from the memory by being configured to:
determine a lower priority address index by multiplying by two the difference between the first logical memory address of the read access request and a lowest address of a predetermined lower priority address range;
determine a first physical memory address of the plurality of physical memory addresses by adding the lower priority address index to the lowest address of the predetermined higher priority address range; and
retrieve the first compressed lower priority memory line stored at the plurality of physical memory addresses beginning at the first physical memory address.

7. The memory access device of claim 6 further configured to:
retrieve lower priority metadata comprising a length of the first compressed lower priority memory line; and
retrieve lower priority data from the first compressed lower priority memory line based on the length of the first compressed lower priority memory line.

8. The memory access device of claim 7 further configured to retrieve the lower priority data from the first compressed lower priority memory line by being configured to:
determine that the first compressed lower priority memory line comprises an exception based on the lower priority metadata;
retrieve an exception pointer from the lower priority metadata;
retrieve, through the memory access port, lower priority exception data stored at an exception memory location in the memory at a physical memory address corresponding to the exception pointer; and
retrieve the lower priority data from the first compressed lower priority memory line and the lower priority exception data.

9. The memory access device of claim 1 further configured to determine that the read access request is a lower priority read access request, by being configured to determine that the first logical memory address of the read access request is within a predetermined lower priority address range.

10. The memory access device of claim 1, further comprising a processor configured to:
determine the priority of the read access request among a higher priority read access request and a lower priority read access request;
in response to determining that the read access request is a higher priority read access request, retrieve through the memory access port the second compressed higher priority memory line from the memory at the first logical memory address of the read access request; and
in response to determining that the read access request is a lower priority read access request, retrieve through the memory access port the first compressed lower priority memory line from the memory at the plurality of physical memory addresses determined based on the first logical memory address of the read access request.

11. The memory access device of claim 1 integrated into an integrated circuit.

12. The memory access device of claim 1 integrated into a device selected from a group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

13. A memory access device for accessing a memory line stored in a memory in a processor-based system, comprising:
a means for receiving a read access request comprising a logical memory address; and
a means for accessing the memory;
a means for determining a priority of the read access request among a higher priority read access request and a lower priority read access request;
a means for retrieving through the means for accessing the memory, a compressed higher priority memory line from the memory at the logical memory address of the read access request in response to the means for determining that the priority of the read access request is a higher priority read access request; and
a means for retrieving through the means for accessing the memory, a compressed lower priority memory line from the memory at a plurality of physical memory addresses determined based on the logical memory address of the read access request in response to the means for determining that the read access request is a lower priority read access request.

14. A method for accessing a memory line stored in a memory in a processor-based system, comprising:
receiving, by a memory access device, a read access request comprising a first logical memory address;
determining a priority of the read access request among a higher priority read access request and a lower priority read access request;
in response to determining that the read access request is a higher priority read access request, retrieving through the memory access port, a first compressed higher priority memory line from the memory at the first logical memory address of the read access request; and
in response to determining that the read access request is a lower priority read access request, retrieving through the memory access port, a first compressed lower priority memory line from the memory at a plurality of physical memory addresses determined based on the first logical memory address of the read access request.

15. The method of claim 14, further comprising, based on determining that the read access request is a higher priority read access request:
   retrieving higher priority metadata of the first compressed higher priority memory line; and
   retrieving higher priority data from the first compressed higher priority memory line based on the higher priority metadata.

16. The method of claim 15, further comprising, based on determining that the read access request is a higher priority read access request, retrieving the first compressed higher priority memory line from an end of a corresponding memory location based on a parity of the first logical memory address and the higher priority metadata.

17. The method of claim 15, further comprising retrieving the higher priority data from the first compressed higher priority memory line by:
   determining that the first compressed higher priority memory line comprises an exception based on the higher priority metadata;
   retrieving an exception index from the higher priority metadata;
   retrieving, through the memory access port, higher priority exception data stored at an exception memory location in the memory at a physical memory address corresponding to the exception index; and
   retrieving the higher priority data from the first compressed higher priority memory line and the higher priority exception data.

18. The method of claim 14, further comprising determining that the read access request is a higher priority read access request, by determining that the first logical memory address of the read access request is within a predetermined higher priority address range.

19. The method of claim 14, further comprising:
   based on determining that the read access request is a lower priority read access request, retrieving the first compressed lower priority memory line from the memory by:
      determining a lower priority address index by multiplying by two the difference between the first logical memory address of the read access request and a lowest address of a predetermined lower priority address range;
      determining a first physical memory address of the plurality of physical memory addresses by adding the lower priority address index to the lowest address of the predetermined higher priority address range; and
      retrieving the first compressed lower priority memory line stored at the plurality of physical memory addresses beginning at the first physical memory address.

20. The method of claim 19, further comprising:
   retrieving lower priority metadata comprising a length of the first compressed lower priority memory line; and
   retrieving lower priority data from the compressed lower priority memory line based on the length of the first compressed lower priority memory line.

21. The method of claim 20, further comprising retrieving the first compressed lower priority memory line from an end of each of the plurality of physical memory addresses based on a parity of a corresponding first logical memory address and the length of the first compressed lower priority memory line.

22. The method of claim 20, further comprising retrieving the lower priority data from the first compressed lower priority memory line by:
   determining that the first compressed lower priority memory line comprises an exception based on the lower priority metadata;
   retrieving an exception pointer from the lower priority metadata;
   retrieving through the memory access port, lower priority exception data stored at an exception memory location in the memory at a physical memory address corresponding to the exception pointer; and
   retrieving the lower priority data from the first compressed lower priority memory line and the lower priority exception data.

23. The method of claim 14, further comprising determining that the read access request is a lower priority read access request, by determining that the first logical memory address of the read access request is within a predetermined lower priority address range.

24. The method of claim 14, further comprising:
   receiving a write access request comprising a second logical memory address and data;
   determining a priority of the write access request among a higher priority write access request and a lower priority write access request;
   in response to determining that the write access request is a higher priority write access request, storing through the memory access port, the data of the write access request in the memory in a second compressed higher priority memory line at the second logical memory address of the write access request; and
   in response to determining that the write access request is a lower priority write access request, storing through the memory access port, the data of the write access request in the memory in a second compressed lower priority memory line at a plurality of physical memory addresses determined based on the second logical memory address of the write access request.

25. The method of claim 24, further comprising, based on determining that the write access request is a higher priority write access request:
   compressing the data of the write access request;
   storing the second compressed higher priority memory line comprising the compressed data of the write access request at an end of a memory location corresponding to the second logical memory address of the write access request based on a parity of the second logical memory address.

26. The method of claim 24, further comprising, based on determining that the write access request is a higher priority write access request:
   compressing the data of the write access request;
   determining that the data of the write access request causes an exception based on the compression of the data of the write access request;
   storing the second compressed lower priority memory line comprising a first portion of the data of the write access request and an exception index at a physical memory address corresponding to the second logical memory address of the write access request; and
   storing higher priority exception data in the memory at a physical memory address corresponding to an exception memory location and the exception index, the higher priority exception data comprising a second portion of the data of the write access request.

27. The method of claim 24, further comprising storing the data of the write access request in the second compressed lower priority memory line at the plurality of physical memory addresses by:
- compressing the data of the write access request;
- determining a lower priority address index by multiplying by two a difference between the second logical memory address of the write access request and a lowest address of a predetermined lower priority address range;
- determining a first physical memory address of the plurality of physical memory addresses by adding the lower priority address index to a lowest address of a predetermined higher priority address range;
- storing a first portion of the second compressed lower priority memory line comprising a first portion of the compressed data of the write access request at the first physical memory address at a first end of the first physical memory address; and
- storing a second portion of the second compressed lower priority memory line comprising a second portion of the compressed data of the write access request at a second physical memory address that is contiguous to the first physical memory address at a second end of the second physical memory address.

28. The method of claim 24, further comprising storing the data of the write access request in the second compressed lower priority memory line at the plurality of physical memory addresses by:
- compressing the data of the write access request;
- determining that the data of the write access request causes an exception based on the compression of the data of the write access request;
- determining a lower priority address index by multiplying by two a difference between the second logical memory address of the write access request and a lowest address of a predetermined lower priority address range;
- determining a first physical memory address of the plurality of physical memory addresses by adding the lower priority address index to the lowest address of a predetermined higher priority address range;
- storing a first portion of the second compressed lower priority memory line comprising a first portion of the data of the write access request at the first physical memory address at a first end of the first physical memory address;
- storing a second portion of the second compressed lower priority memory line comprising a second portion of the data of the write access request at a second physical memory address that is contiguous to the first physical memory address at a second end of the second physical memory address;
- storing an exception pointer in at least one of the first portion of the second compressed lower priority memory line and the second portion of the second compressed lower priority memory line; and
- storing a third portion of the data of the write access request at a third physical memory address corresponding to the exception pointer.

29. The method of claim 24, further comprising storing a lower priority metadata comprising a length of the second compressed lower priority memory line in the second compressed lower priority memory line.

30. A processor-based system for accessing a memory line stored in a memory, comprising:
- a memory;
- a processor coupled to the memory and configured to access the memory;
- a memory access device, coupled to the memory and the processor, the memory access device configured to:
  - receive a read access request comprising a logical memory address from the processor;
  - determine a priority of the read access request among a higher priority read access request and a lower priority read access request;
  - in response to determining that the read access request is a higher priority read access request, retrieve a compressed higher priority memory line from the memory at the logical memory address of the read access request; and
  - in response to determining that the read access request is a lower priority read access request, retrieve a compressed lower priority memory line from the memory at a plurality of physical memory addresses determined based on the logical memory address of the read access request.

* * * * *